(12) United States Patent
Egri, II

(10) Patent No.: US 9,200,439 B1
(45) Date of Patent: *Dec. 1, 2015

(54) FIREWALL SYSTEM AND METHOD

(71) Applicant: John David Egri, II, Fort Myers, FL (US)

(72) Inventor: John David Egri, II, Fort Myers, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,687

(22) Filed: Feb. 23, 2015

Related U.S. Application Data

(63) Continuation-in-part of application No. 14/469,324, filed on Aug. 26, 2014, now Pat. No. 8,973,330.

(51) Int. Cl.
| | |
|---|---|
| *E04B 1/343* | (2006.01) |
| *E04B 1/94* | (2006.01) |
| *E04B 1/41* | (2006.01) |
| *E04B 2/56* | (2006.01) |
| E04B 1/38 | (2006.01) |
| E04B 7/04 | (2006.01) |
| E04B 1/26 | (2006.01) |
| E04B 1/24 | (2006.01) |

(52) U.S. Cl.
CPC . *E04B 1/941* (2013.01); *E04B 1/40* (2013.01); *E04B 2/56* (2013.01); *E04B 1/2608* (2013.01); *E04B 1/38* (2013.01); *E04B 7/045* (2013.01); *E04B 2001/2415* (2013.01); *E04B 2001/2439* (2013.01); *E04B 2001/405* (2013.01)

(58) Field of Classification Search
CPC ........... E04B 1/2608; E04B 1/38; E04B 1/40; E04B 7/045; E04B 7/04; E04B 2001/2415; E04B 2001/2439
USPC ............ 52/73, 36.4, 715, 707, 289, 702, 710, 52/506.06, 712, 713, 714, 551, 506.05, 52/489.1, 489.2, 605, 573.1; 248/216.1, 248/231.91, 268, 300; 403/403
See application file for complete search history.

(56) References Cited

U.S. PATENT DOCUMENTS

| | | | | |
|---|---|---|---|---|
| 5,720,571 | A * | 2/1998 | Frobosilo et al. ............. | 403/403 |
| 5,846,018 | A * | 12/1998 | Frobosilo et al. ............. | 403/403 |
| 6,213,679 | B1* | 4/2001 | Frobosilo et al. ............. | 403/403 |
| 7,918,054 | B2* | 4/2011 | Grafton et al. ................ | 52/92.3 |
| 8,973,330 | B2* | 3/2015 | Egri, II ........................ | 52/573.1 |

* cited by examiner

*Primary Examiner* — Chi Q Nguyen
(74) *Attorney, Agent, or Firm* — George F. Wallace

(57) ABSTRACT

A firewall system includes a wall stud; a wall covering; and an expansion furring. An expansion furring can have a top having first and second top edges; a side, having a side edge, and extending from one of the first and second top edges; and a furring flange, extending from the side edge, and being formed of one or more deformable materials. The furring flange can be attached to the wall stud and to the wall covering with the expansion furring being disposed between the wall stud and furring. The furring flange absorbs, via deformation, at least a portion of movement of the wall stud due to heat-based expansion of the wall stud.

28 Claims, 7 Drawing Sheets

FIREWALL SYSTEM AND METHOD

RELATED DOCUMENTS

This Continuation-in-Part is related to, incorporates by reference in its entirety, and claims the priority benefit of U.S. patent application Ser. No. 14/469,324, now U.S. Pat. No. 8,973,330, entitled "EXPANSION BRACKET, SYSTEM, AND METHOD," and filed on Aug. 26, 2014 by John David Egri, II, which in turn, incorporated by reference in its entirety, and claimed the priority benefit of, now abandoned, U.S. patent application Ser. No. 13/740,870, entitled "Expansion Bracket," and filed on Jan. 14, 2013 by John David Egri, II.

FIELD OF THE INVENTION

The present invention relates to building material attachment brackets and firewalls.

BACKGROUND OF THE INVENTION

Building material attachment brackets are used in the building construction industry to attach a plurality of building material components to one another to form and assemble structures, such as dwellings and buildings.

SUMMARY OF THE INVENTION

It is, therefore, an object of the present invention to provide an expansion bracket that can absorb movement of a wall stud to prevent damage to a wall covering attached to the wall stud. It is another object of the present invention to provide a firewall system that can absorb movement of a wall stud to prevent damage to a wall covering attached to the wall stud.

An exemplary environment of the present invention can include, but is not limited to, a wall, a floor, a subfloor or a ceiling. For convenience purposes, use of the term "wall" throughout this document is expressly intended to include a floor, a subfloor, and a ceiling.

The present invention can be embodied in an expansion bracket having a main body.

In an exemplary aspect, the main body can include a main body flange, which can be formed of a deformable material, and can have a wall stud attachment end that can be configured to attach to a wall stud via a wall stud attachment element. The main body can further include a furring attachment element that can be configured to attach a furring to the main body.

In a further exemplary aspect, if the main body is attached to the wall stud and the furring, and the wall covering is attached to the furring via a wall covering attachment element, the main body flange can absorb, via deformation, at least a portion of the movement of the wall stud due to heat-based expansion of the wall stud.

The present invention can be formed, in whole or in part, from one or more of the following materials: a metal, a plastic, a polymer, wood, a naturally-occurring material, a man-made material, and/or any other material that is functionally compatible with the present invention as described and/or claimed. Exemplary metals can include, but are not limited to, steel, iron, copper, chrome and titanium.

Any combination of the following additional and/or optional exemplary aspects of the present invention can be additionally provided:

the main body can include an expansion slot through the main body, and at least a portion of the expansion slot can be adjacent to the main body flange;

at least a portion of the main body flange can have at least one of an arc shape, a linear shape, and a spiral shape;

the furring attachment element can include a plurality of tabs configured to attach the furring to the main body;

the furring attachment element can be configured to attach to the main body via a main body attachment element, and the furring attachment element can be rotatable around at least one axis defined at least in part by the main body attachment element, and if the main body is attached to the wall stud and the furring attachment element, and the furring is attached to the furring attachment element and the wall covering, the furring attachment element can be configured to absorb, via rotation around the at least one axis, at least a part of the movement of the wall stud due to the heat-based expansion of the wall stud;

the furring attachment element can include a plurality of tabs that can be configured to attach the furring to the furring attachment element;

the furring attachment element can be configured to attach to the main body via a main body attachment element, and the furring attachment element can have a furring attachment flange, which can be formed of one of the deformable material and another deformable material, and can have a flange attachment end that can be configured to attach to the main body via the main body attachment element, and if the main body is attached to the wall stud and the furring attachment element, and the furring is attached to the furring attachment element and the wall covering, the furring attachment element can be configured to absorb, via deformation, at least a part of the movement of the wall stud due to the heat-based expansion of the wall stud; and at least a portion of the furring attachment flange can have at least one of an arc shape, a linear shape, and a spiral shape.

An additional exemplary embodiment of the present invention includes a method of installing an expansion bracket, which can then absorb movement of a wall stud to prevent damage to a wall covering attached to the wall stud.

The following are exemplary aspects of such a method:

attaching a main body of the expansion bracket to the wall stud;

attaching a furring to the main body;

attaching the wall covering to the furring; and the main body can include a main body flange, formed from a deformable material, and having a wall stud attachment end configured to attach the main body to the wall stud via a wall stud attachment element, and a furring attachment element configured to attach the furring to the main body, such that if the main body is attached to the wall stud and the furring, and the wall covering is attached to the furring, the main body flange can be configured to absorb, via deformation, at least a portion of the movement of the wall stud due to heat-based expansion of the wall stud.

Of the following optional exemplary aspects of the present invention, one or more can be combined with a method of the present invention:

the main body can include an expansion slot through the main body, and at least a portion of the expansion slot can be adjacent to the main body flange;

at least a portion of the main body flange can have at least one of an arc shape, a linear shape, and a spiral shape;

the furring attachment element can include a plurality of tabs which can be configured to attach the furring to the main body;

attaching a furring to the main body can include attaching the furring to the main body via a main body attachment element, with the furring attachment element being rotatable around at least one axis defined at least in part by the main body attachment element, and if the main body is attached to the wall stud and the furring attachment element, and the furring is attached to the furring attachment element and the wall covering, the furring attachment element can be configured to absorb, via rotation around the at least one axis, at least a part of the movement of the wall stud due to the heat-based expansion of the wall stud;

the main body can include an expansion slot through the main body, and at least a portion of the expansion slot can be adjacent to the main body flange;

attaching of a furring to the main body can include attaching the furring to the main body via a main body attachment element, with the furring attachment element having a furring attachment flange, formed of one of the deformable material and another deformable material, and having a flange attachment end that can be configured to attach to the main body via the main body attachment element, such that if the main body is attached to the wall stud and the furring attachment element, and the furring is attached to the furring attachment element and the wall covering, the furring attachment element can be configured to absorb, via deformation, at least a part of the movement of the wall stud due to the heat-based expansion of the wall stud; and at least a portion of the furring attachment flange can have at least one of an arc shape, a linear shape, and a spiral shape.

IN an exemplary embodiment, an expansion furring can include a top having first and second top edges; at least one side having a side edge, and extending from one of the first and second top edges; and a furring flange extending from a respective side edge. Optionally, an expansion furring can include a second side extending from the other of the first and second top edges.

In an exemplary aspect of this embodiment, a wall covering is attached to said top via a wall covering attachment element.

In another exemplary aspect of this embodiment, a furring flange can be formed of one or more deformable materials, and can be configured to attach to a wall stud via a wall stud attachment element.

In a further exemplary aspect, where an expansion furring is attached to at least one wall stud and to a wall covering, at least one furring flange absorbs, via deformation, movement of the at least one wall stud due to the heat-based expansion of the at least one wall stud.

In yet another exemplary aspect of this embodiment, a furring flange can include an expansion slot through the furring flange.

In a further exemplary aspect of this embodiment, at least a portion of the furring flange and/or an expansion slot includes at least one of an arc shape, a linear shape, and a spiral shape.

In still another exemplary aspect of this embodiment, the expansion furring can be formed from a unitary piece of construction, or from multiple pieces.

In still yet another exemplary aspect of this embodiment, where two furring flanges are provided, each furring flange can be planar along a single axis. In a further exemplary aspect, said top and a side can form an angle $\theta$, where $0° < \theta < 180°$. In still a further exemplary aspect, said top can be planar along a first axis and each furring flange can be planar along a second axis, with the first and second axes being parallel.

In still yet another exemplary aspect, a firewall system can include at least one wall stud, an expansion furring, and a wall covering, with the expansion furring being attached to, and between, the at least one wall stud and the wall covering.

Another exemplary embodiment of the present invention includes a method of installing an expansion furring to, and between, at least one wall stud and a wall covering, such that the expansion furring absorbs movement of one or more of the at least one wall stud due to heat-based expansion of the at least one wall stud to prevent damage to the wall covering. In an exemplary aspect, such a method can include attaching an expansion furring to at least one wall stud via at least one wall stud attachment element; and attaching a wall covering to the expansion furring via at least one wall covering attachment element.

These and other exemplary aspects of the present invention are described herein.

BRIEF DESCRIPTION OF THE DRAWINGS

The present invention is illustrated by way of example, and not in limitation, in the figures of the accompanying drawings.

DETAILED DESCRIPTION OF THE INVENTION

Figure 1:
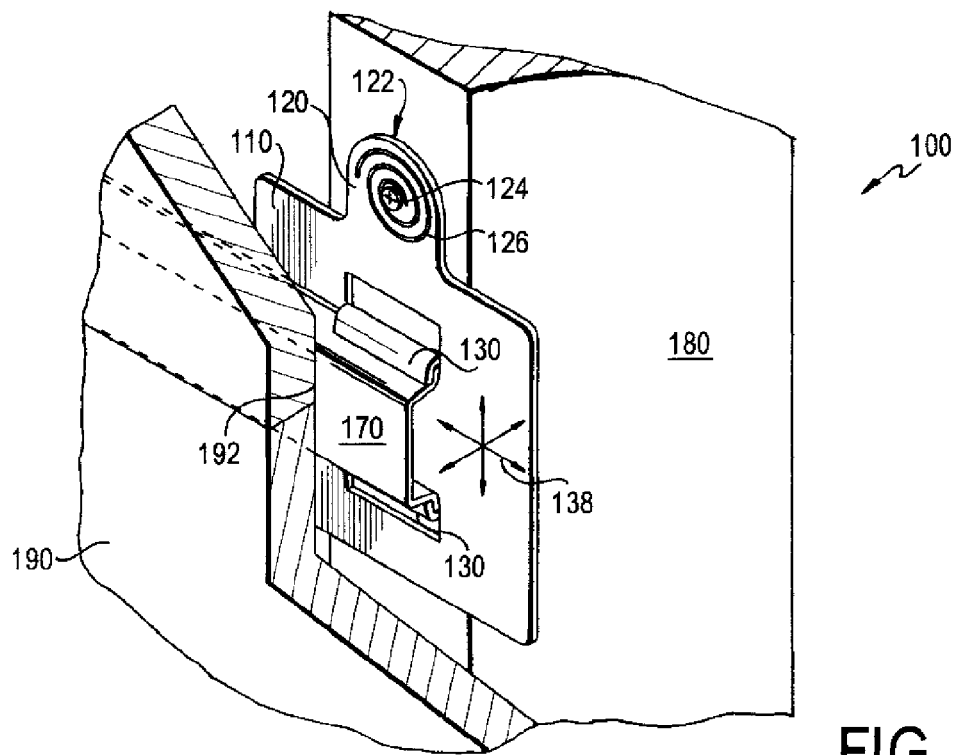
FIG. 1 illustrates an exemplary embodiment of the present invention, in which an expansion bracket includes a main body, a main body flange and a furring attachment element.

The present invention will now be described in more detail by way of example with reference to the embodiments shown in the accompanying figures. It should be kept in mind that the following described aspects and embodiments are only presented by way of example and should not be construed as limiting the inventive concept to any particular physical configuration, material, or order.

Building construction consists of forming or assembling a structure on real property. These structures generally consist of at least one of a wall, a floor, and a ceiling.

A wall is a vertical structure that defines an area; for example, a wall can delineate a building or structure, support its superstructure, separate space inside the building or structure, and act as an acoustic buffer. A wall comprises a plurality of components attached to one another, including, but not limited to structural elements such as studs and joists, insulation, and surface or finish elements, such as drywall and other wall coverings. A wall can be load-bearing, for example, to support a floor, a ceiling, and a roof, or non-load bearing, for example, a partition wall that defines an interior area or a curtain wall that has only decorative qualities.

A floor provides a walking surface and can define a level in a building or structure. A floor can consist of a subfloor and a floor covering. The subfloor can provide the strength and structure of the floor, and can consist of a plurality of components attached to one another, including, but not limited to, structural elements, such as beams and joists, and underlayments, for example, moisture resistant barriers such as AC grade plywood and composite sheeting. Subfloors can also contain additional underlayments to support concrete, hardwood, tile, and any other material contemplated for use as a floor covering.

A ceiling can be an overhead interior surface that covers the upper limit of a room. Generally, a ceiling can be a non-structural underside of a floor; however, a ceiling can have concealing qualities and secondarily provide support to a given structure.

Building construction is subject to a set of rules that specify the minimum acceptable level of safety for a constructed object. These rules can include minimizing the risk and spread of fire and also the minimum qualities of the building materials used. Building materials can be required to possess minimum characteristics and also minimize the risks of fire.

A fire resistance rating of a building material or structure can be defined by the duration for which the material can withstand a fire resistance test. A fire resistance test involves placing a test sample, such as a mock up section of a wall, floor or ceiling, into a high-temperature furnace with one side of the sample exposed to fire for a period of time. The fire resistance rating can be based on a plurality of test specifications, including but not limited to the length of time required for fire to penetrate the sample, the length of time required for the sample to exceed a specified average heat rise above an ambient temperature, and whether a hose-stream test is passed after removal of the test sample from the furnace. The longer the time period associated with failure of the individual components, the higher the fire resistance rating.

Embodiments of the present invention, as illustratively shown in the figures, define a structural element to assist with the minimization of fire risk in a building or structure.

FIG. 1 illustrates one exemplary embodiment of the present invention, in which an expansion bracket 100 can include a main body 110. The expansion bracket 100 can absorb movement of a wall stud 180 to prevent damage to a wall covering 190 attached to the wall stud 180. As further illustrated in FIG. 1, main body 110 can include a main body flange 120 and a furring attachment element 130.

The main body flange 120 can be formed of a deformable material. A deformable material can be one that changes shape or size due to an applied force or a change in temperature. The types of deformation can include, but are not limited to, pulling or tensile deformation, pushing or compressive deformation, shear, bending, torsion or twisting, and strain, which can also be defined as thermally activated mobility of structural defects within the material.

Types of deformable materials can include, but are not limited to, a metal, a plastic, a polymer, wood, a naturally-occurring material, a man-made material, and/or any other material that is functionally compatible with the present invention as described and/or claimed.

The main body flange 120 can include a wall stud attachment end 122, which can be the location at which the main body 110 is attached to the wall stud 180. It should be noted that main body flange 120 is illustratively shown in FIG. 1 as having at least a portion that is arc shaped, but any other functionally compatible shape can be provided. For example, at least a portion of main body flange 120 can alternatively or additionally have a linear shape. It is expressly set forth that all possible shapes of main body flange 120 include at least a portion having an arc or linear shape, which can form any shape, including a spiral shape.

It should also be noted that main body flange 120 is illustratively shown in FIG. 1 as being a lip, but any other functionally compatible structure can be provided. For example, main body flange 120 can be an internal or external ridge or rim, or be a separate plate or ring used to form a lip, ridge or rim on the main body 110.

It should also be noted that in FIG. 1 main body flange 120 is illustratively shown as a single element, however, a plurality of main body flanges 120 can be provided where functionally desired. For example, as illustratively shown in FIGS. 3 and 4, main body flanges 320, 420 can be located at the directional top and bottom of the main body 310, 410. Optional configurations of the main body flange 120 can include, but are not limited to, more than three flanges, which can be located on main body 110.

As further illustrated in FIG. 1, the wall stud attachment end 122 can be configured to attach to wall stud 180, via a wall stud attachment element 124. It should be noted that wall stud attachment element 124 is illustratively shown as a screw; however any functionally compatible attachment element can be provided. For example, wall stud attachment element 124 can have one or more components that attach, or cooperatively attach, the wall stud attachment end 122 to wall stud 180, such as one or more of a screw, a nail, a screw or bolt with an optional complementarily shaped washer and/or nut, a rivet, a nail and a washer, one or more staples, or any other functionally compatible attachment element.

Figure 2:
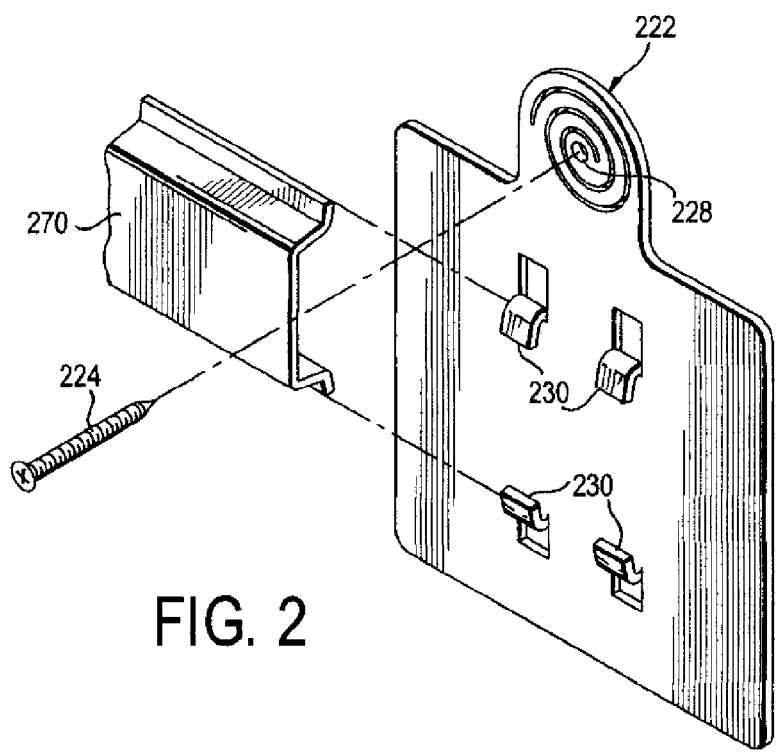
FIG. 2 illustrates an exemplary aspect of the present invention, in which an expansion bracket includes a furring attachment element having a plurality of tabs.

FIG. 2 illustrates an exemplary aspect of wall stud attachment end 222; wall stud attachment element 224 can pass through wall stud attachment end 222 via a guide hole 228. It should be noted that guide hole 228 is illustratively shown in FIG. 2 as being circular and passing through the wall stud attachment end 222, however any structurally compatible guide element can be provided. For example, guide hole 228 can be a demarcated dent or a stamped image not passing through the attachment end 222, or any geometric, symmetric, asymmetric, regular or oversized shape with or without a washer and/or corresponding screw or bolt, passing through the attachment end 222 that corresponds with the dimensions of the stud attachment element 224.

As also illustrated in FIG. 1, wall stud attachment end 122 can include an expansion slot 126. Expansion slot 126 can be configured to pass through the main body 110, and at least a portion of expansion slot 126 can be adjacent to the main body flange 120. It should be noted that expansion slot 126 is illustratively shown in FIG. 1 as having at least a portion that is arced, however, any other functionally compatible shape can be provided. For example, as illustratively shown in FIGS. 3 and 4, expansion slot 326, 426 can have at least a portion that is linear. Additional embodiments of expansion slot 126 can include, but are not limited to, expansion slot 126 having at least a portion that is linear or arced. It is expressly set forth that all possible shapes of expansion slot 126 include at least a portion having an arc or linear shape. It should also be noted that for embodiments with a plurality of wall stud attachment ends, any two wall stud attachment ends can have the same or differently shaped expansion slots.

As further illustrated in FIG. 1, the furring attachment element 130 can be configured to attach a furring 170 to the main body 110. In another exemplary aspect, optionally, furring attachment element 130 can be configured to slidably engage furring 170 to the main body 110. This slidable engagement can facilitate movement of the furring 170 relative to main body 110.

It should be noted that furring attachment element 130 is illustratively shown in FIG. 1 as tabs that can slidably engage furring 170; however any functionally compatible attachment structure or number of attachment structures for engagement can be provided. For example, furring attachment element 130 can optionally include one or more short or elongated tabs with at least one for the top and the bottom of the furring 170, respectively. FIG. 2 illustrates an exemplary embodiment of the present invention with furring attachment element 230 being a plurality of tabs.

Figure 3:
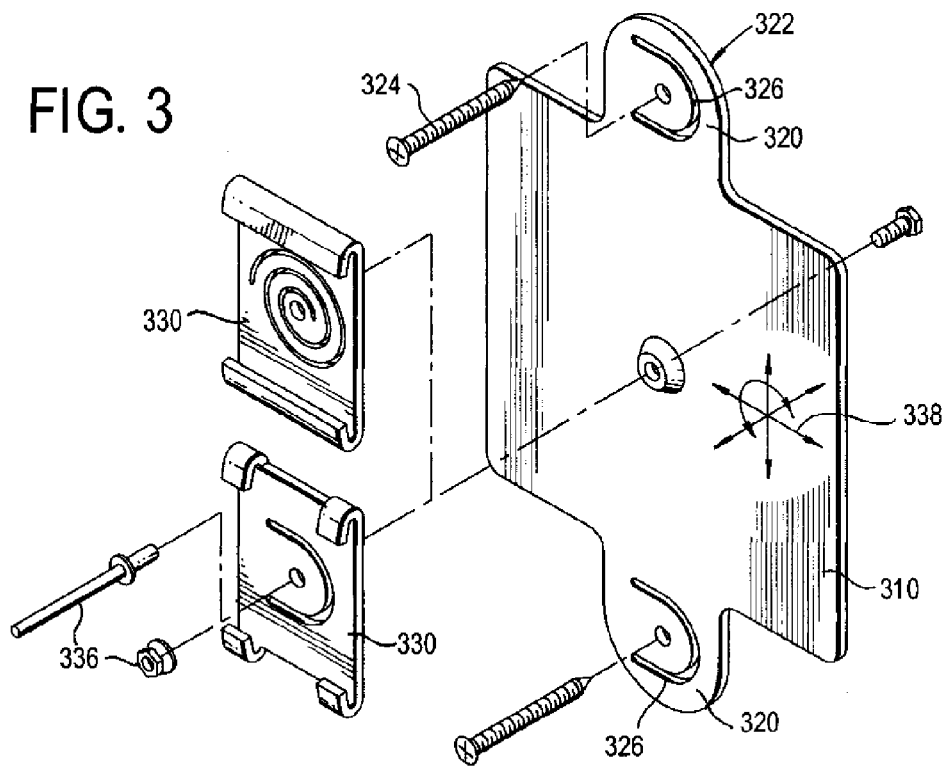
FIG. 3 illustrates an exemplary aspect of the present invention, in which an expansion bracket includes a furring attachment element which can be configured to attach to the main body via a main body attachment element.
Figure 4:
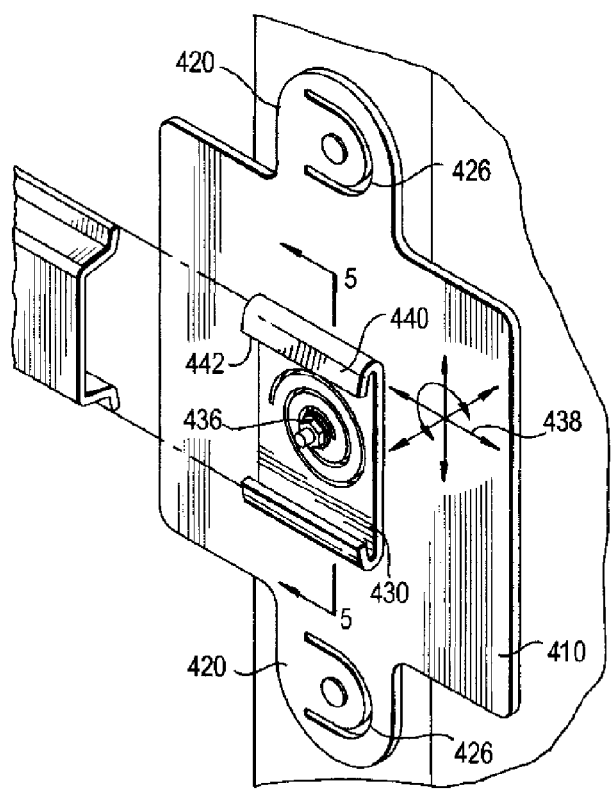
FIG. 4 illustrates an exemplary aspect of the present invention, in which an expansion bracket can include a furring attachment element rotatable around at least one axis.

It should further be noted that in FIG. 1, furring attachment element 130 is illustratively shown as being formed as part of the main body 110; however, as illustrated in FIGS. 3 and 4, furring attachment element 330, 430 can optionally be attached to the main body via a main body attachment element 336, 436, respectively. As illustrated shown in FIG. 3, furring attachment element 330 can optionally be one configuration or another configuration, however, one furring attachment element 330 can be attached to the main body 310 at a time.

FIG. 3 illustrates an additional exemplary aspect of the present invention, in which furring attachment element 330 can be attached to the main body 310 via a main body attachment element 336, with the furring attachment element being rotatable around at least one axis 338 and/or having a deformable flange (described in FIG. 4). Notably, furring attachment element 330 need not be provided with both of these aspects. The at least one axis 338 can be defined, at least in part, by the main body attachment element 336. In this exemplary embodiment, furring attachment element 330 can be configured to absorb, via rotation around the at least one axis 338, at least part of the movement of a wall stud due to the heat-based expansion of the wall stud. In particular, furring attachment element 330 can be configured to absorb, via rotational movement, when the main body 310 is attached to the wall stud and the furring attachment element 330, and the furring is attached to the furring attachment element 330 and a wall covering.

FIG. 4 illustrates another exemplary embodiment of the present invention, in which furring attachment element 430 is illustrated as being attached to the main body 410 via a main body attachment element 436. In a further exemplary aspect, furring attachment element 430 can have a furring attachment flange 440 formed of the same or different deformable material as the main body flange 420. As illustrated, furring attachment flange 440 can have a flange attachment end 442, and can be configured to attach to the main body 410 via main body attachment element 436. Notably, furring attachment element 430 can be configured to absorb, via deformation, at least a part of the movement 438 of the wall stud due to heat-based expansion of the wall stud. In particular, furring attachment element 430 can be configured to absorb such movement 438 when the main body 410 is attached to the furring attachment element 430 and a wall covering.

It should be noted that main body attachment elements 336, 436 as illustrated in FIGS. 3 and 4 can include, but are not limited to, one or more components that attach, or cooperatively attach, the furring attachment element 330, 430 to main body 310, 410, such as one or more of a screw, a nail, a screw or bolt with an optional complementarily shaped washer and/or nut, a rivet, a nail and a washer, one or more staples, or any other functionally compatible attachment element. FIG. 3 illustrates another exemplary aspect of the present invention, in which a main body flange 320 can be disposed at both the top and the bottom of the main body 310. It should be noted that in FIG. 3, main body flange 320 is illustratively shown as being two elements, however, any number of main body flanges 320 can be provided.

As illustratively shown in FIG. 3, wall stud attachment end 322 can be configured to attach to a wall stud, via a wall stud attachment element 324. It should be noted that wall stud attachment element 324 is illustratively shown as a screw; however any functionally compatible attachment element can be provided. For example and not in limitation, wall stud attachment element 324 can be one or more components that attach, or cooperatively attach, the wall stud attachment end 322 to wall stud 380, such as one or more of a screw, a nail, a screw or bolt with an optional complementarily shaped washer and/or nut, a rivet, a nail and a washer, one or more staples, or any other functionally compatible attachment element.

As also illustrated in FIG. 3, wall stud attachment end 322 can optionally include an expansion slot 326. Expansion slot 326 can be configured to pass through the main body 310, and at least a portion of expansion slot 326 can be adjacent to the main body flange 320. It should be noted that expansion slot 326 is illustratively shown in FIG. 3 as having at least a portion that is arced, however, any other functionally compatible shape can be provided. For example, at least a portion of expansion slot 326 can have a linear or spiral shape. It is expressly set forth that all possible shapes of expansion slot 326 include at least a portion having an arc or linear shape. It should also be noted that in embodiments with a plurality of wall stud attachment ends 322, any two wall stud attachment ends can have the same or differently shaped expansion slots.

Figure 5:
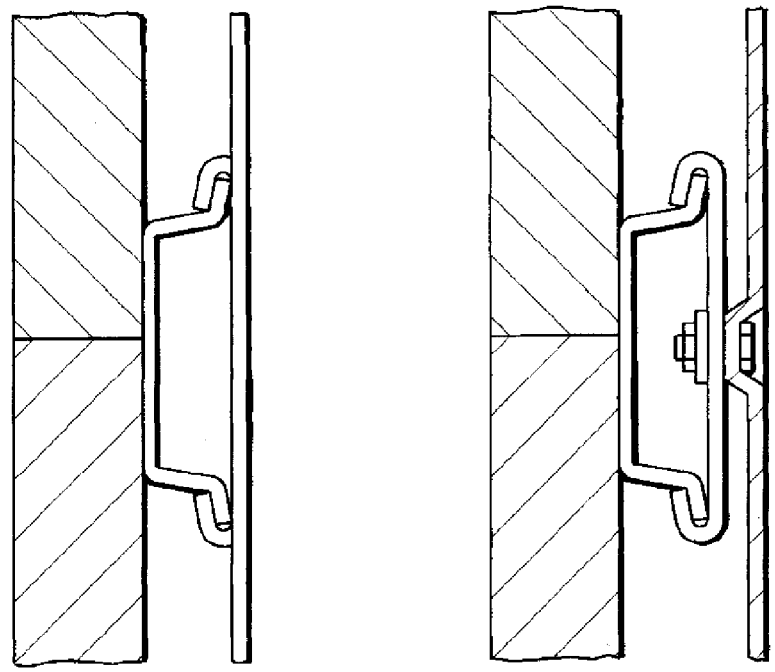
FIG. 5 illustrates an exemplary aspect of the present invention, in which cross-section views illustrate an expansion bracket attached between a wall stud and a wall covering.

FIG. 5 illustrates a cross section of the exemplary wall stud attachment configurations illustratively shown in FIGS. 1-4.

Figure 6:
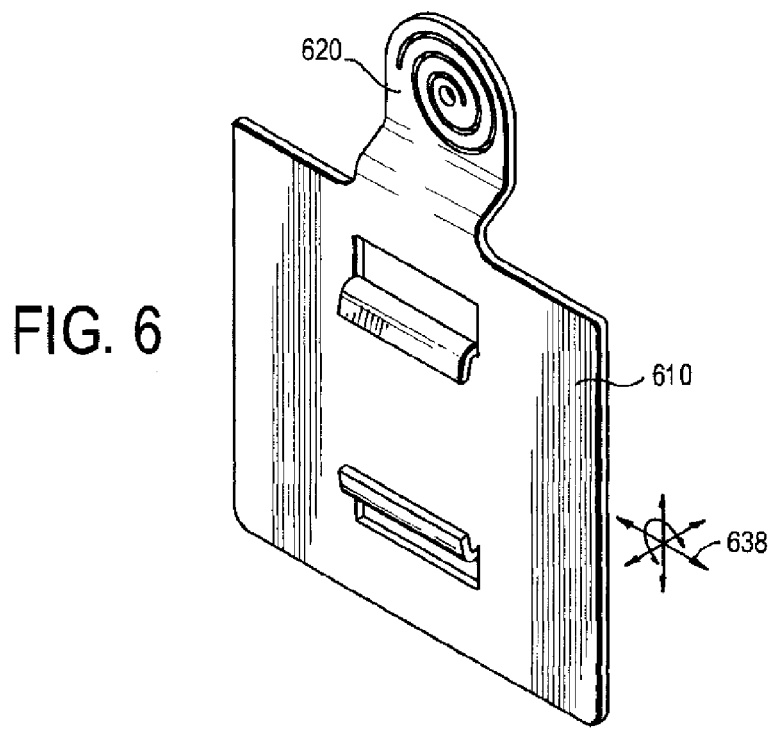
FIG. 6 illustrates an exemplary embodiment of the present invention, in which an expansion bracket can includes an offset main body flange.

FIG. 6 illustrates still another exemplary embodiment of the present invention, in which main body flange 620 can be offset from main body 610. It should be noted that the offset is illustrated in the z-direction 638; however, any functionally compatible offset, including direction, can be provided. Thus, the main body flange 620 can be offset in any direction relative to the stud.

Figure 7:
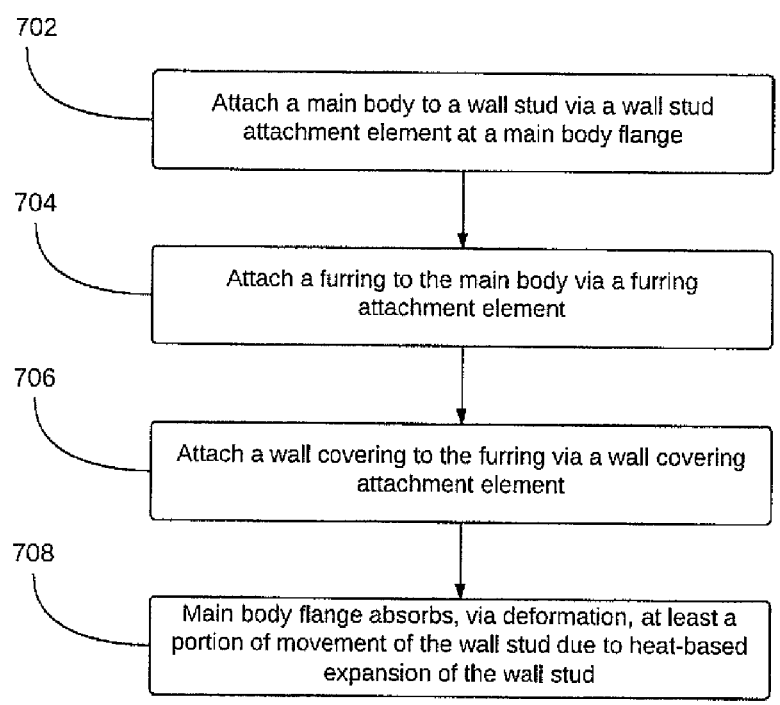
FIG. 7 illustrates an exemplary method of installing an expansion bracket for absorbing movement of a wall stud to prevent damage to a wall covering attached to the wall stud.

FIG. 7 illustrates an exemplary method of installing an expansion bracket according to the present invention. The following exemplary steps can be carried in any functionally compatible order: the main body can be attached to a wall stud (block 702); a furring can be attached to the main body (block 704); and a wall covering can be attached to the furring (block 706). The main body can be attached to the wall stud via a wall stud attachment element, as described herein. Further, a wall stud attachment element can pass through the main body to a wall stud at a wall stud attachment end, as described above.

At 704, the furring can be attached to the main body. As described above, attachment of the furring to the main body can occur through one of the embodiments of the furring attachment element, for example, a tab that is short or elongated, an aperture that is round, oval, square, or any other geometric, symmetric, asymmetric, regular or irregular shape, in whole or in part, etc.

The wall covering can be attached to the furring at 706, by a wall covering attachment element. Optionally, the wall covering attachment element can have one or more components that attach, or cooperatively attach, the wall covering to the furring, such as one or more of a screw, a nail, a screw or bolt with an optional complementarily shaped washer and/or nut, a rivet, a nail and a washer, one or more staples, or any other functionally compatible attachment element.

At 708 the main body flange can absorb at least some of the movement produced by heat-based expansion of the wall stud. Movement that can be absorbed includes, but is not limited to, deformational, rotational, linear, twisting, or any other movement.

Figure 8:
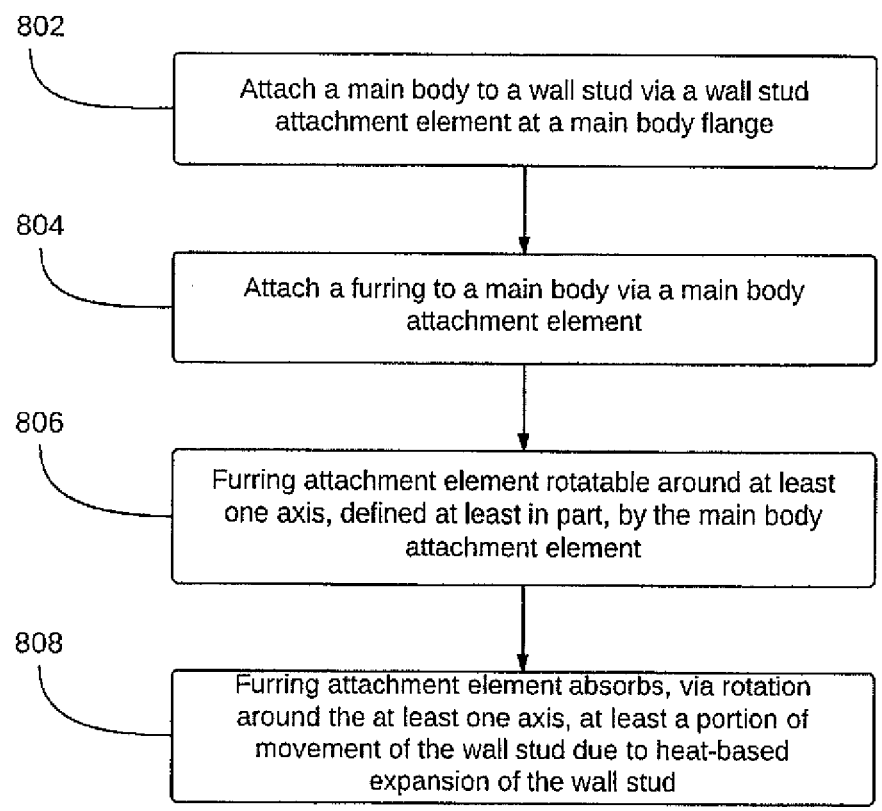
FIG. 8 illustrates another exemplary method of installing an expansion bracket for absorbing movement of a wall stud to prevent damage to a wall covering attached to the wall stud.

FIG. 8 illustrates another exemplary method of installing an expansion bracket according to the present invention. The following exemplary steps can be carried in any functionally compatible order: a main body can be attached to a wall stud (block 802) and a furring can be attached to the main body via a main body attachment element (block 804). The main body can be attached to the wall stud via a wall stud attachment element, as described herein. Further, a wall stud attachment element can pass through the main body to a wall stud at a wall stud attachment end, as described above.

At 804, the furring can be attached to the main body, via a main body attachment element. The main body can include an expansion slot through the main body. Optionally, at least a portion of the expansion slot can be adjacent to a main body flange. As described above, the main body flange can have at least a portion that is arc or linear shaped. It is expressly set forth that all possible shapes of main body flange include at least a portion having an arc or linear shape, which can form any shape, including a spiral shape.

At 806, the furring attachment element can be configured to be rotatable around at least one axis, defined at least in part by the main body attachment element. The furring attachment element, as described above, can include a plurality of tabs configured to slidably attach the furring to the furring attachment element.

At 808, the furring attachment element can absorb, via rotation around at the least one axis, at least part of the movement produced by heat-based expansion of the wall stud. Movement that can be absorbed includes, but is not limited to, deformational, rotational, linear, twisting, or any other movement. The furring attachment element can be configured to absorb such movement when the main body is attached to the wall stud and the furring attachment element, and the furring is attached to the furring attachment element and the wall covering.

Figure 9:
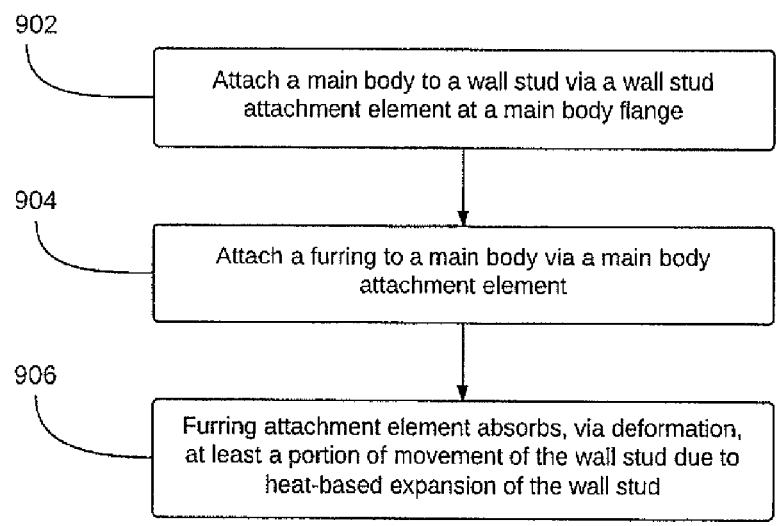
FIG. 9 illustrates yet another exemplary method of installing an expansion bracket for absorbing movement of a wall stud to prevent damage to a wall covering attached to the wall stud.

FIG. 9 illustrates yet another exemplary method of installing an expansion bracket according to the present invention. The following exemplary steps can be carried in any functionally compatible order: a main body can be attached to a wall stud (block 902) and a furring can be attached to the main body via a main body attachment element (block 904). The main body can be attached to the wall stud via a wall stud attachment element, as described herein.

At 904, the furring can be attached to the main body, via a main body attachment element. The main body can include an expansion slot through the main body. Optionally, at least a portion of the expansion slot can be adjacent to a main body flange. As described above, the main body flange can have at least a portion that is arc or linear shaped. It is expressly set forth that all possible shapes of main body flange include at least a portion having an arc or linear shape, which can form any shape, including a spiral shape.

At 906, the furring attachment element can absorb, via deformation, at least part of the movement produced by heat-based expansion of the wall stud. Movement that can be absorbed includes, but is not limited to, deformational, rotational, linear, twisting, or any other movement. The furring attachment element can be configured to absorb such movement when the main body is attached to the wall stud and the furring attachment element, and the furring is attached to the furring attachment element and the wall covering. The furring attachment element, optionally, can include a plurality of tabs configured to slidably attach the furring to the furring attachment element.

Also at 906, the furring attachment element can have a furring attachment flange formed of a deformable or another deformable material. The furring attachment flange can have at least a portion that is arc or linear-shaped. It is expressly set forth that all possible shapes of the furring attachment flange include at least a portion having an arc or linear shape, which can form any shape, including a spiral shape. The furring attachment element can also have a flange attachment end, which can be configured to attach to the via the main body attachment element.

Figure 10A:
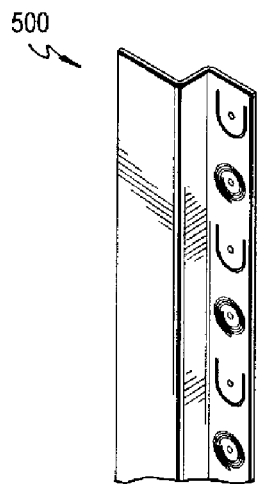
FIG. 10a illustrates an exemplary expansion furring having different expansion shapes.
Figure 10B:
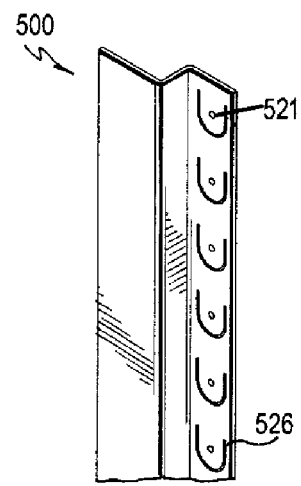
FIG. 10b illustrates an exemplary expansion furring having multiple expansion shapes.
Figure 10C:
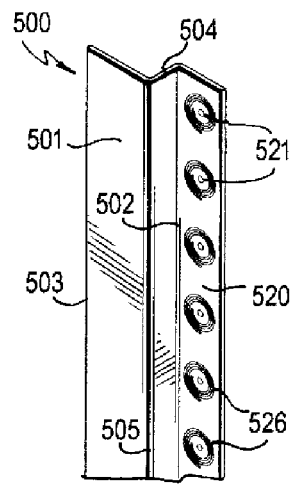
FIG. 10c illustrates another exemplary expansion furring having multiple expansion shapes.

FIG. 10*a*-10*c* illustrate another exemplary embodiment of the present invention, in which an expansion furring 500 includes a top 501 having first and second top edges 502, 503; a side 504, having a side edge 505, and extending from the first top edge; and a furring flange 520 extending from the side edge.

FIGS. 10*a*-10*c* illustrate exemplary aspects of the present invention, in which furring flange 520, which can be formed of any one or deformable materials, can include at least one expansion slot 526 through the furring flange, and where plural slots are provided, such slots can be shaped the same, similarly, dissimilarly, and/or can be provided in any alternating or changing sequence. Notably, an expansion slot 526 can optionally be provided in an elongated shape to span any desired length of furring flange 520 to the extent desired and functionally consistent with the present invention. Further, at least a portion of an expansion slot 526 can include at least one of an arc shape, a linear shape, and a spiral shape.

Figure 11:
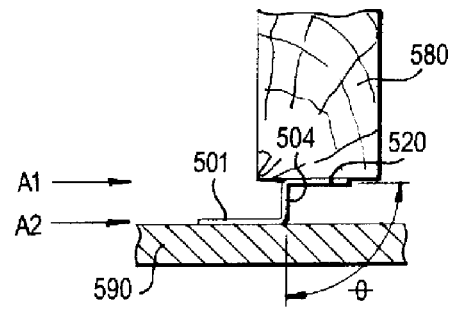
FIG. 11 illustrates an exemplary expansion furring attached to, and between, a wall stud and a wall covering.

FIG. 11 illustrates an exemplary attachment of expansion furring 500 to, and between, a wall stud 580 and a wall covering 590. As illustrated, furring flange 520 can be attached to wall stud 580 via a wall stud attachment element (not shown); and wall covering 590 can be attached to top 501 via a wall covering attachment element (not shown). Notably, a wall stud attachment element and a wall covering attachment element can include any one or more of a screw, nail, staple, adhesive, or any other attachment structure or device disclosed herein or apparent herefrom, including any equivalents thereof. As further illustrated, top 501 and side 504 can form an angle $\theta$, which as illustrated is about 45°, but can be any angle such that $0° < \theta < 180°$.

In another exemplary aspect of the invention, furring flange 520 can be formed of one or more deformable materials, and can include at least one wall stud attachment portion 521, with each wall stud attachment portion being configured to compatibly allow attachment of furring flange 520 to a wall stud 580 via a wall stud attachment element. As illustrated in FIG. 10*a*-10*c*, such a wall stud attachment portion 521 can define an aperture for a screw or nail, for example and not in limitation, but can be provided as any shape complementary to a functionally compatible attachment of, or attachment structure for, furring flange 520 to wall stud 580.

In a further exemplary aspect, where expansion furring 500 is attached to at least one wall stud 580 and to wall covering 590, the at least one furring flange 520 absorbs, via deformation, movement of the at least one wall stud due to the heat-based expansion of the at least one wall stud.

In still another exemplary aspect of this embodiment, expansion furring 500 can be formed from a unitary piece of construction, or from multiple pieces. For example, and not in limitation, expansion furring 500 can be provided as a single piece of material, with the same being bent and/or shaped to form top 501, one or more sides 502, and a furring flange(s) 520.

Figure 12:
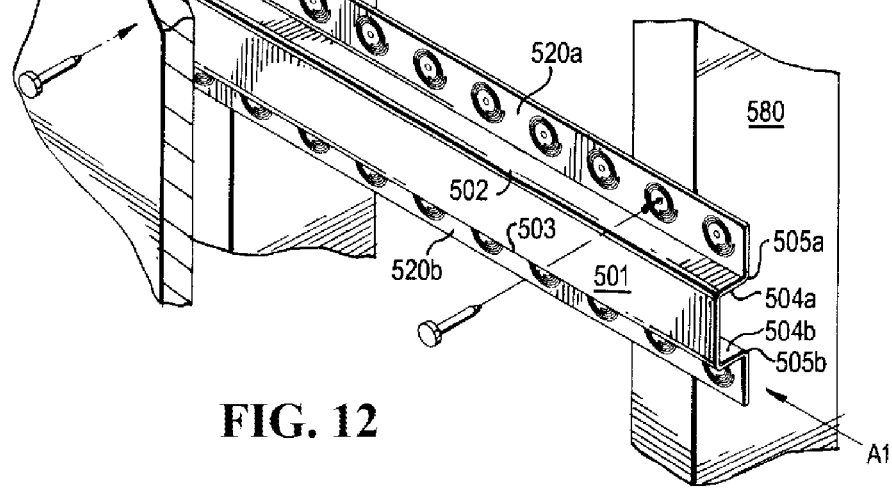
FIG. 12 illustrates attachment of an exemplary expansion furring to, and between, plural wall studs and a wall covering.

As illustrated in FIG. 12, optionally, expansion furring 500 can include first and second sides 504*a*, 504*b* respectively extending from first and second top edges 502, 503, and respectively having side edges 505*a*, 505*b*. As further illustrated, expansion furring 500 can also optionally include first and second furring flanges 520*a*, 520*b*, respectively extending from side edges 505*a*, 505*b*. Accordingly, one or both furring flanges 520*a*, 520*b* can be attached to one or more wall studs 580, and wall covering 590 can be attached to top 501, such that at least one furring flange 520*a*, 520*b* absorbs, via deformation, movement of at least one wall stud 580 due to heat-based expansion of the at least one wall stud.

In another exemplary aspect of this embodiment, as illustrated in FIG. 11, with the provisioning of a single furring flange 520 or dual furring flanges 520*a*, 520*b*, each furring flange 520 can be configured to be planar along a first axis A1, and top 501 can be configured to be planar along a second axis A2, with the first and second axes being parallel. In still another exemplary aspect, as illustrated in FIG. 12, where furring flanges 520*a*, 520*b* are provided, each furring flange can be coplanar along a single axis A1.

In another exemplary aspect, the present invention can be embodied in a firewall system, which can include at least one wall stud 580, an expansion furring 500, and a wall covering 590, with the expansion furring being attached to, and connected between, the at least one wall stud and the wall covering.

In another exemplary aspect, the present invention can be embodied in a method of installing expansion furring 500 to, and between, at least one wall stud 580 and a wall covering 590, such that the expansion furring absorbs movement of one or more of the at least one wall stud due to heat-based expansion of the at least one wall stud to prevent damage to the wall covering. In an exemplary aspect, such a method can include expansion furring 500 having a single furring flange 520 or dual furring flanges 520*a*, 520*b*.

It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement and components shown and described above, but may be susceptible to numerous variations within the scope of the invention. Moreover, particular exemplary features described herein in conjunction with specific embodiments and/or aspects of the present invention are to be construed as applicable to any embodiment described within, enabled thereby, or apparent herefrom. Thus, the specification and drawings are to be regarded in a broad, illustrative, and enabling sense, rather than a restrictive one.

Further, it will be understood that the above description of the embodiments of the present invention are susceptible to various modifications, changes, and adaptations, and the same are intended to be comprehended within the meaning and range of equivalents of the appended claims.

Therefore I claim:

1. A firewall system, comprising:
    a wall stud;
    a wall covering; and
    an expansion furring, said expansion furring comprising,
        a top having first and second top edges,
        a side, having a side edge, and extending from one of the first and second top edges, and
        a furring flange, extending from the side edge, and being formed of one or more deformable materials;
    wherein when the furring flange is attached to said wall stud via a wall stud attachment element and to said wall covering via a wall covering attachment element attached to the top, said expansion furring is disposed between said wall stud and said furring, and the furring flange is configured to absorb, via deformation, at least a portion of movement of said wall stud due to heat-based expansion of said wall stud.

2. The system of claim 1, wherein the furring flange includes at least one expansion slot through the furring flange.

3. The system of claim 2, wherein the at least one expansion slot includes at least one of an arc shape, a linear shape, and a spiral shape.

4. The system of claim 1, wherein the furring flange includes a plurality of expansion slots.

5. The system of claim 4, wherein the plurality of expansion slots includes at least one of an arc shape, a linear shape, and a spiral shape.

6. The system of claim 1, wherein said expansion furring is formed from a unitary piece of construction.

7. The system of claim 1, wherein said expansion furring is formed from multiple pieces of construction.

8. The system of claim 1, wherein the top is planar along a first axis, and the furring flange is planar along a second axis parallel to the first axis.

9. The system of claim 1, said expansion furring further comprising
    another side, having another side edge, and extending from the other of the first and second top edges, and
    another furring flange, extending from the other side edge, and being formed, at least in part, of at least one of the one or more deformable materials and another deformable material,
    wherein when each furring flange is attached to said wall stud via a respective wall stud attachment element and to said wall covering via the wall covering attachment element attached to the top, said expansion furring is disposed between said wall stud and said furring, and each furring flange is configured to absorb, via deformation, the at least a portion of movement of said wall stud due to the heat-based expansion of said wall stud.

10. The system of claim 9, wherein each furring flange includes at least one expansion slot through the respective furring flange.

11. The system of claim 10, wherein each expansion slot includes at least one of an arc shape, a linear shape, and a spiral shape.

12. The system of claim 9, wherein at least one of the furring flange and the other furring flange includes a plurality of expansion slots.

13. The system of claim 12, wherein the plurality of expansion slots includes at least one of an arc shape, a linear shape, and a spiral shape.

14. The system of claim 9, wherein said expansion furring is formed from a unitary piece of construction.

15. The system of claim 14, wherein said expansion furring is formed from multiple pieces of construction.

16. The system of claim 9, wherein the top is planar along a first axis, and the furring flange and the other furring flange are planar along a second axis parallel to the first axis.

17. The system of claim 9, wherein the furring flange and the other furring flange are planar along a single axis.

18. A method of constructing a firewall configured to absorb movement of a wall stud to prevent damage to a wall covering, said method comprising:
    attaching a furring flange of an expansion furring to the wall stud; and
    attaching the wall covering to a top of the expansion furring;
    wherein the furring flange is formed of one more deformable materials and the expansion furring is attached between the wall stud and the wall covering, such that the furring flange absorbs, via deformation, at least a portion of the movement of the wall stud due to heat-based expansion of the wall stud.

19. The method of claim 18, wherein the furring flange includes at least one expansion slot through the furring flange.

20. The method of claim 19, wherein the at least one expansion slot includes at least one of an arc shape, a linear shape, and a spiral shape.

21. The method of claim 18, wherein the furring flange includes a plurality of expansion slots through the furring flange.

22. The method of claim 21, wherein the plurality of expansion slots includes at least one of an arc shape, a linear shape, and a spiral shape.

23. The method of claim 18, further comprising
    attaching another furring flange of the expansion furring to the wall stud;
    wherein at least one of the furring flange and the other furring flange absorb, via deformation, the at least a portion of the movement of the wall stud due to the heat-based expansion of the wall stud.

24. The method of claim 23, wherein the top is planar along a first axis, and the furring flange and the other furring flange are planar along a second axis parallel to the first axis.

25. The method of claim 23, wherein each furring flange includes at least one expansion slot through the furring flange.

26. The method of claim 25, wherein each expansion slot includes at least one of an arc shape, a linear shape, and a spiral shape.

27. The method of claim 23, wherein each furring flange includes a plurality of expansion slots through the furring flange.

28. The method of claim 27, wherein each expansion slot includes at least one of an arc shape, a linear shape, and a spiral shape.

\* \* \* \* \*